(12) United States Patent
Kawaguchi et al.

(10) Patent No.: US 8,582,597 B2
(45) Date of Patent: Nov. 12, 2013

(54) TIME SLOT INTERCHANGER

(75) Inventors: Mitsuhiro Kawaguchi, Kawasaki (JP); Shosaku Yamasaki, Kawasaki (JP); Shigeo Tani, Kawasaki (JP); Hideki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 12/155,402

(22) Filed: Jun. 3, 2008

(65) Prior Publication Data

US 2008/0304508 A1    Dec. 11, 2008

(30) Foreign Application Priority Data

Jun. 7, 2007 (JP) ................................. 2007-151935

(51) Int. Cl.
*H04L 12/43* (2006.01)

(52) U.S. Cl.
USPC .......................................................... 370/458

(58) Field of Classification Search
USPC ......... 370/376, 222–224, 458, 431, 442, 369, 370/524; 711/170–173, 200
See application file for complete search history.

(56) References Cited

U.S. PATENT DOCUMENTS

| | | | |
|---|---|---|---|
| 4,999,832 A | | 3/1991 | Chen et al. |
| 5,883,902 A | * | 3/1999 | Wille et al. ................... 370/524 |
| 6,034,947 A | * | 3/2000 | Yoshida et al. ............... 370/244 |
| 6,330,237 B1 | * | 12/2001 | Suda et al. ..................... 370/369 |
| 6,839,319 B2 | | 1/2005 | Shimadoi et al. |
| 6,967,948 B2 | * | 11/2005 | Iacovino et al. .............. 370/384 |
| 2004/0017493 A1 | | 1/2004 | Daiku et al. |
| 2005/0271045 A1 | | 12/2005 | Mo |

FOREIGN PATENT DOCUMENTS

| | | |
|---|---|---|
| EP | 0 594 356 | 4/1994 |
| EP | 0 987 861 | 3/2000 |
| JP | 10-208027 | 8/1998 |
| JP | 11-275039 | 10/1999 |
| JP | 2002-171271 | 6/2002 |
| JP | 2004-112738 | 4/2004 |

OTHER PUBLICATIONS

UK Patent Office Action, mailed Aug. 18, 2008 and issued in corresponding UK Patent Application No. GB0808980.7.
Chinese Office Action issued Dec. 7, 2010 in corresponding Chinese Patent Application 200810108930.3.

* cited by examiner

*Primary Examiner* — Mark Rinehart
*Assistant Examiner* — Gbemileke Onamuti
(74) *Attorney, Agent, or Firm* — Staas & Halsey LLP

(57) ABSTRACT

There is provided a time slot interchanger for processing channel setting data functioning as control data for interchanging time slots of multiplexed transmission data. In the time slot interchanger, processing of the channel setting data based on alarm data is performed in accordance with a preset first transmission capacity, and with respect to the channel setting data in accordance with a preset second transmission capacity, processing of the channel setting data in accordance with the first transmission capacity is dispersedly performed in a time series manner.

6 Claims, 18 Drawing Sheets

FIG. 7

| Bit | Field |
|---|---|
| 15 | Cross Connect Enable setting (1:enable、0:UNEQ/AIS setting) |
| 14 | 160G #No. (160G #0~160G #7) |
| 13 | |
| 12 | |
| 11 | 80G #No. (80G #0, 80G #1) |
| 10 | SYS #No. (SYS #0~SYS #F) |
| 9 | |
| 8 | |
| 7 | |
| 6 | Side No. (0:Side 1, 1:Side 2) |
| 5 | CH No. (CH01~CH48) |
| 4 | |
| 3 | |
| 2 | |
| 1 | |
| 0 | |

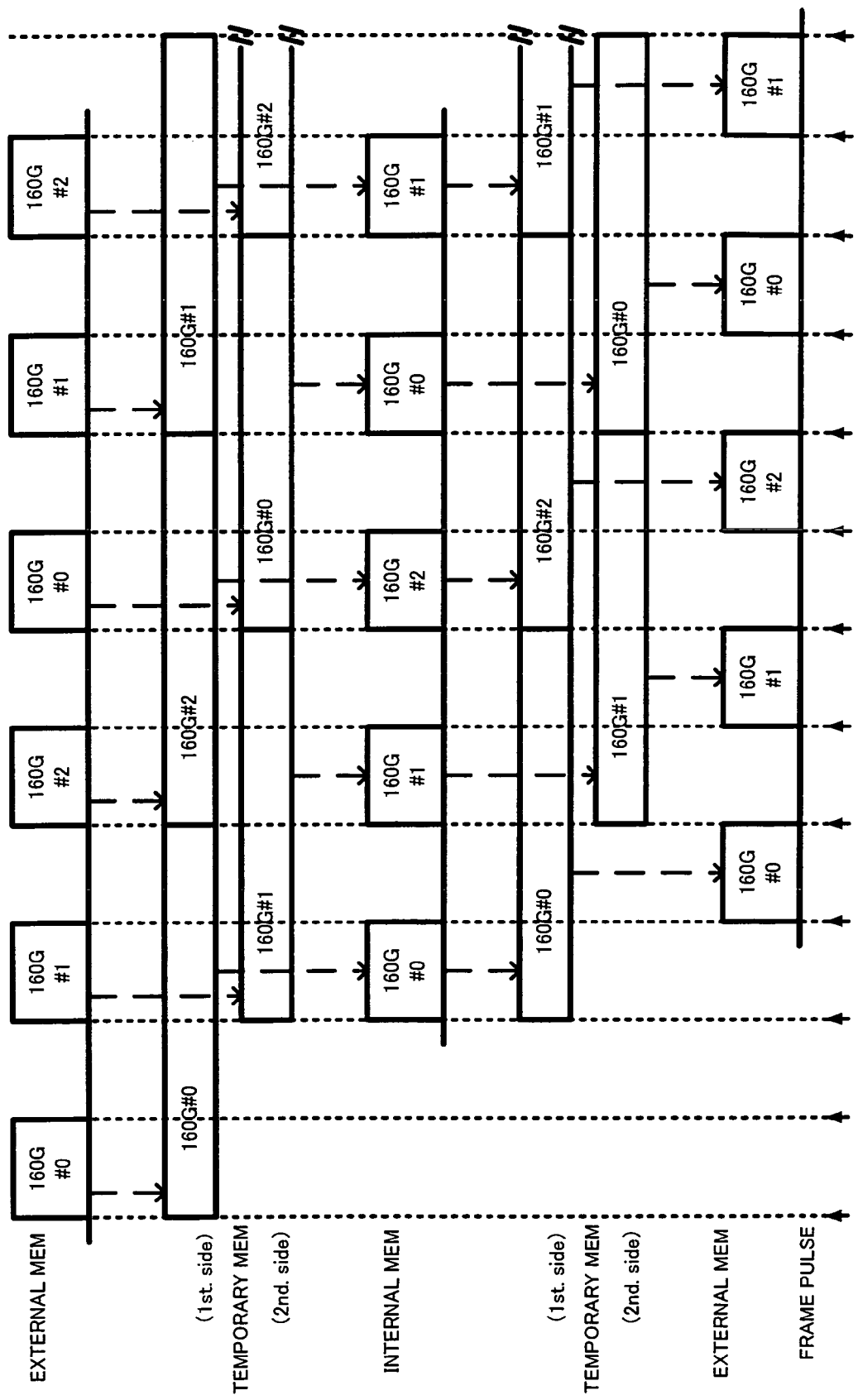

TIME SLOT INTERCHANGER

TECHNICAL FIELD

The time slot interchanger relates to a technique for interchanging time slots allocated to multiplied transmission data, and more specifically it relates to suppressing the increase in circuit scale by repeatedly processing channel setting data using basic circuitry of a low memory capacity to process the channel setting data serving as information for interchanging time slots of the transmission data, even when the interchange of time slots allocated to high capacity transmission data is processed.

SUMMARY

According to an aspect of an embodiment, the time slot interchanger comprises a first memory for repeatedly storing data for processing the channel setting data in accordance with a preset first transmission capacity dispersedly in a time series manner so as to process the channel setting data in accordance with a preset second transmission capacity, having memory capacity corresponding to the first transmission capacity, and a second memory for storing the channel setting data and alarm data in accordance with the second transmission capacity, having memory capacity corresponding to the second transmission capacity, wherein the first transmission capacity is 1/n (n:integer) of the second transmission capacity.

According to an aspect of an embodiment, when channel setting data serving as information for interchanging time slots of transmission data is processed, the channel setting data of all channels to be accommodated is not collectively processed, and there is no need to provide memories corresponding to all channels. Also, there is provided basic circuitry with a memory capacity that is 1/n (n: an integer) of the memory capacity corresponding to all channels, and by using the basic circuitry, the channel setting data of all channels can be processed by performing processings repeatedly n times. This allows the downsizing of circuitry for processing channel setting data.

Furthermore, when the channel setting processing capacity increases, this increase in the channel setting processing capacity can be accommodated by increasing the number of repetitions of processings in the basic circuitry, without increasing circuits such as memories.

BRIEF DESCRIPTION OF THE DRAWINGS

FIG. 7 is a diagram of a signal format showing a construction of the channel setting data for each channel;

FIG. 18 is a diagram showing 480 Gbps capacity timing.

DESCRIPTION OF THE PREFERRED EMBODIMENTS

Hereinafter, the embodiments will be described in detail with reference to the appended drawings. In these drawings, the same or like components are designated by the same symbols.

Figure 1:
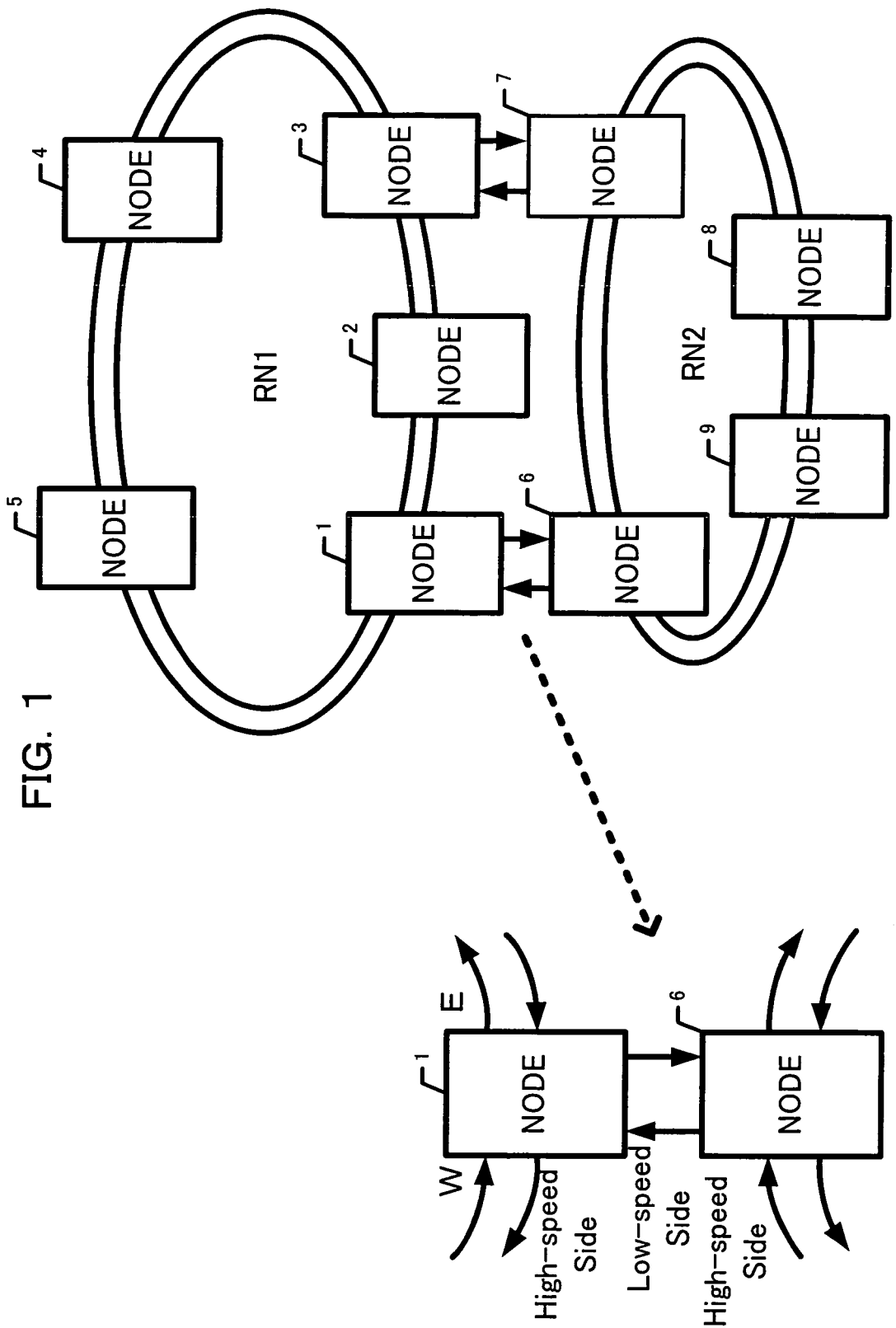
FIG. 1 is a diagram of a system constituting two ring networks by node devices.

FIG. 1 shows that node devices each serving as a time slot interchanger with Add/Drop/MUX function constitutes two ring networks. The node devices 1 to 5 constitute one ring network RN1 of 2F-BLSR (2 fiber-bi-directional line switched ring) scheme, while the node devices 6 to 9 constitute one ring network RN2 of 2F-BLSR scheme. The node devices 1 and 3, respectively, are connected to the node device 6 and 7 by lines of low-speed side, and a ring interconnection is established that allows communications between the ring networks RN1 and RN2 even when a failure occurs in the lines of low-speed side.

The formations for interconnecting two BLSR networks includes a DCP (drop and continue on protection bandwidth) formation and a DTP (dual transport on protection bandwidth) formation. The DCP formation is one in which the connection between the primary node device and the secondary node device in the same ring network is established using a protection channel, and in which a terminal node device is located outside the primary and secondary node devices. The DTP formation is one in which the terminal node device is located between the primary node device and the secondary node device.

In FIG. 1, the ring network RN1 has the DTP formation. In the ring network RN1, the node device 1 is used as the primary node device, the node device 3 is used as the secondary node device, and the node device 2 is used as the terminal node device. On the other hand, the ring network RN2 has the DCP formation. In the ring network RN2, the node device 6 is used as the primary node device, the node device 7 is used as the secondary node device, and the node device 9 is used as the terminal node device.

Figure 2:
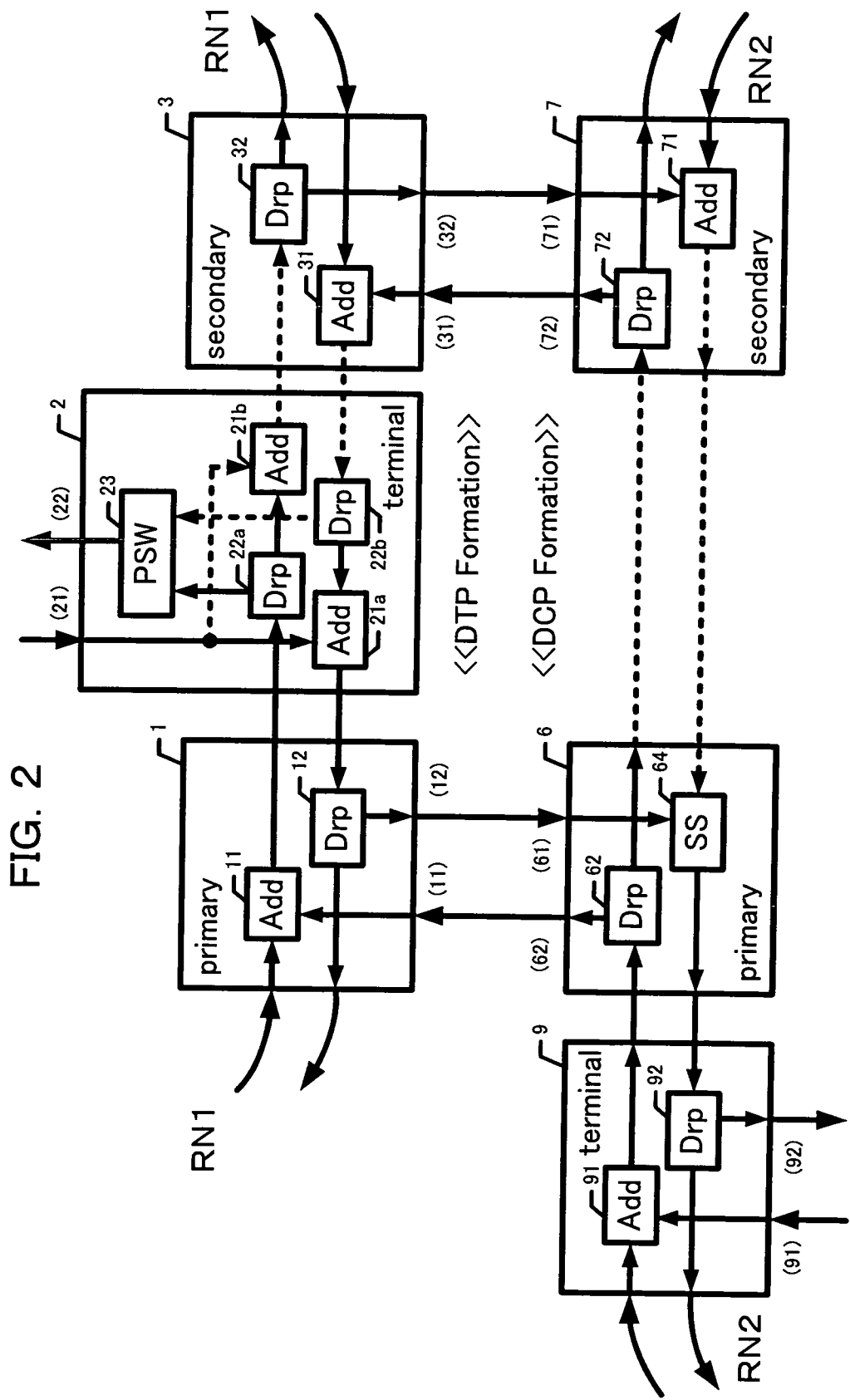
FIG. 2 is a diagram of a system constituting interconnections.

FIG. 2 shows an outline of functions needed for explaining flows of signals by the interconnection, regarding the node devices 1, 2, and 3, and the node devices 6, 7, and 9 constituting the interconnection in the system construction in FIG. 1.

Here, description is made of an example of flows of signals from a low-speed side line (91) of the terminal node device 9 constituting the ring network RN2 to a low-speed side line (22) of the terminal node device 2 constituting the ring network RN1. A signal from the low-speed side line (91) of the terminal node device 9 is inserted into the ring network RN2 at an insertion part (Add part) 91, and after having been branched at a branch part (Drp part) 62 of the primary node device 6, it is inserted into the ring network RN1 at an Add part 11 via a low-speed side line (62), as a signal on a line (11) of the primary node device 1 constituting the ring network RN1. Also, from the Drp part 62 of the primary node device 6, this signal passes through a protection bandwidth of the ring network RN2, and is branched at a Drp part 72 of the secondary node device 7, and inserted into the ring network RN1 at an Add part 31 via the low-speed side line (72), as a signal on a line (31) of the secondary node device 3 constituting the ring network RN1. These signals inserted into the ring network RN1 are branched at respective Drp parts 22a and 22b of the terminal node device 2, and inputted into a path switch part (PSW part) 23. If there is no fault on the low-side channels of the primary node device 6 and the primary node device 1, the PSW part 23 selects the signal from the Drp part 22a. Otherwise, the PSW part 23 selects the signal from the Drp part 22b. The selected signal is outputted to the low-speed side line (22).

As signals in the opposite direction, flows of signals from a low-speed side line (21) of the terminal node device 2 to a low-speed side line (92) of the terminal node device 9 will be now described. The signal from the low-speed side line (21) of the terminal node device 2 is inserted into a work bandwidth in the ring network RN1 at an Add part 21a, and into a protection bandwidth at an Add part 21b. The signal inserted into the work bandwidth is branched at a Drp part 12 of the primary node device 1, and inserted into a service selector part (SS part) 64 via a low-speed side line (12), as a signal on a low-speed side line (61) of the secondary node device 6 constituting the ring network RN2. The signal inserted into the protection bandwidth is branched at a Drp part 32 of the primary node device 3, and inserted into a protection bandwidth of the ring network RN2 via a low-speed side line (32), as a signal on the low-speed side line (71) of the secondary node device 7 constituting the ring network RN2. If there is no fault on the low-side channels of the primary node device 6 and the primary node device 1, the SS part 64 of the primary node device 6 selects the signal from the low-speed side line (61). Otherwise, the SS part 64 selects the signal with a protection bandwidth from the secondary node 7. The selected signal is branched at a Drp part 92 of the terminal node device 9, and outputted to a low-speed side line (92), as a signal with a work bandwidth in the ring network RN2.

Figure 3:
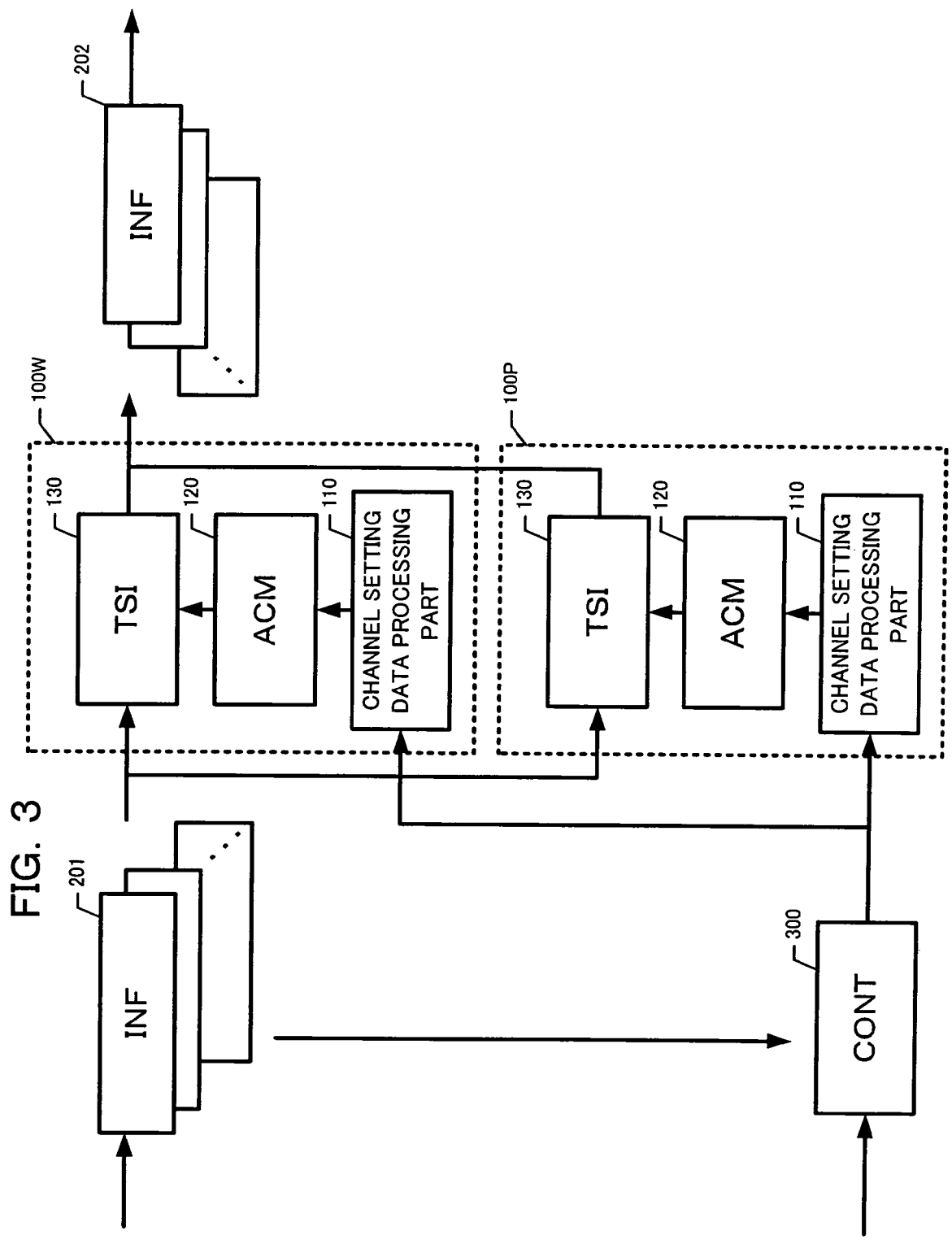
FIG. 3 is an apparatus block diagram.

FIG. 3 is an apparatus block diagram. An outline of a time slot interchanger serving as, for example, a SONET (synchronous optical network)/SDH (synchronous digital hierarchy)-adaptive apparatus is described using this figure.

Reference numerals 201 and 202, respectively, denote line interfaces (INF) on the reception side and on the transmission side. Reference numerals 100W and 100P, respectively, denote a work time slot interchanger and a protection time slot interchanger. For generically naming these time slot interchangers, reference numeral 100 is used. Reference numeral 110 denotes a channel setting data processing part, 120 denotes an address control memory (ACM) part, and 130 denotes a time slot interchange (TSI) part. The time slot interchanger 100 is constituted by comprising these parts. Reference numeral 300 denotes an unit control (CONT) part.

A line interface part 201 receives a transmission path signal, and detects a transmission path alarm or the like to thereby notifies the unit control part 300 of the alarm or the like.

The line interface part 202 transmits a transmission path signal.

The unit control part 300 receives channel setting data from an external device such as a maintenance device, and transmits the channel setting data allocated in accordance with time slots of the transmission data, to the time slot interchangers 100W and 100P. The unit control part 300 also receives a transmission path alarm from the line interface part 201 or the like, and transmits the alarm data to the time slot interchangers 100W and 100P, as control information for processing channel setting data for time slot interchange. Here, the transmission path alarm refers to information included in TOH (transport over head); which is a transmission path format corresponding to SONET/SDH.

The time slot interchange part 130 performs interchange of time slots of transmission data using the following procedure. First, the time slot interchange part 130 receives transmission data from the line interface part 201, then writes the received transmission data into a memory (not shown) provided in the time slot interchange part 130, based on write addresses from the address control memory part 120, and reads out the transmission data from the memory, based on read addresses form the address control memory part 120.

The address control memory part 120 generates write addresses and read addresses to be notified to the time slot interchange part 130, based on channel setting data from the channel setting data processing part 110. The address control memory part 120 generates sequential addresses for write addresses, and random addresses for read addresses. That is, the time slot interchanger part 130 writes the received transmission data based on said sequential addresses, and the address control memory part 120 generates said random addresses for reading out time slots of the written transmission data based on corresponding addresses, in order to interchange the time slots of the written transmission data in accordance with the channel setting data.

From the unit control part 300, the channel setting data processing part 110 receives channel setting data that is allocated in accordance with time slots of the transmission data, and that shows to which time slots channel signals constituting the transmission data are allocated. The channel setting data processing part 110 also receives, from the unit control part 300, alarm data for processing channel setting data for time slot interchange. Then, the channel setting data processing part 110 sets the channel setting data, in accordance with the time slots of the transmission data received by the time slot interchange part 130. Also, in accordance with the alarm data, the channel setting data processing part 110 switches the channel setting data to channel setting data corresponding to the interchange destination of the channel signals. For example, when attempting to switch the channel signals from a work band to a protection bandwidth because of an occurrence of transmission path failure, the channel setting data processing part 110 switches the channel signals from time slots with the work bandwidth to time slots with the protection bandwidth.

First Embodiment

In this first embodiment, for example, a time slot interchanger (may also be described as a node device) constitutes a 2F-BLSR ring network, and a maximum value of transmission capacity processed by one time slot interchanger is assumed to be 160 Gbps, that is, the one time slot interchanger is assumed to accommodate up to 64 lines of STS (synchronous transport signal)-48 with a line speed of 2.4 Gbps, and as its processing unit (hereinafter this may also be referred to as CH (channel)) of channel setting, STS-1 (this may also be described as 51.84 Mbps or transmission capacity 50 Mbps) is assumed.

Figure 4:
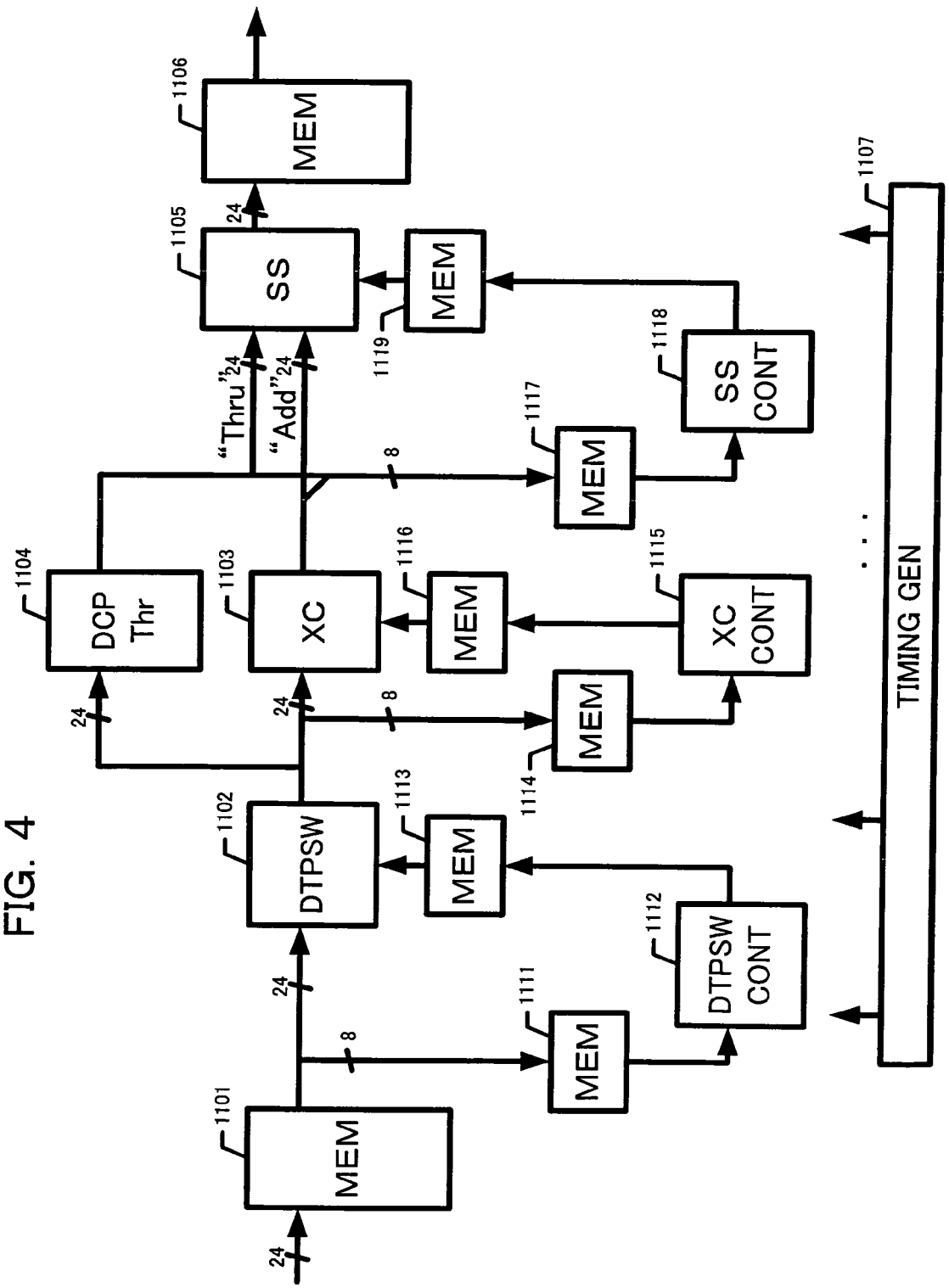
FIG. 4 is a diagram of a function construction of a channel setting data processing part.

FIG. 4 shows an outline of a function construction of the channel setting data processing part 110 illustrated in FIG. 3. Details of each function will be described later.

Figure 5:
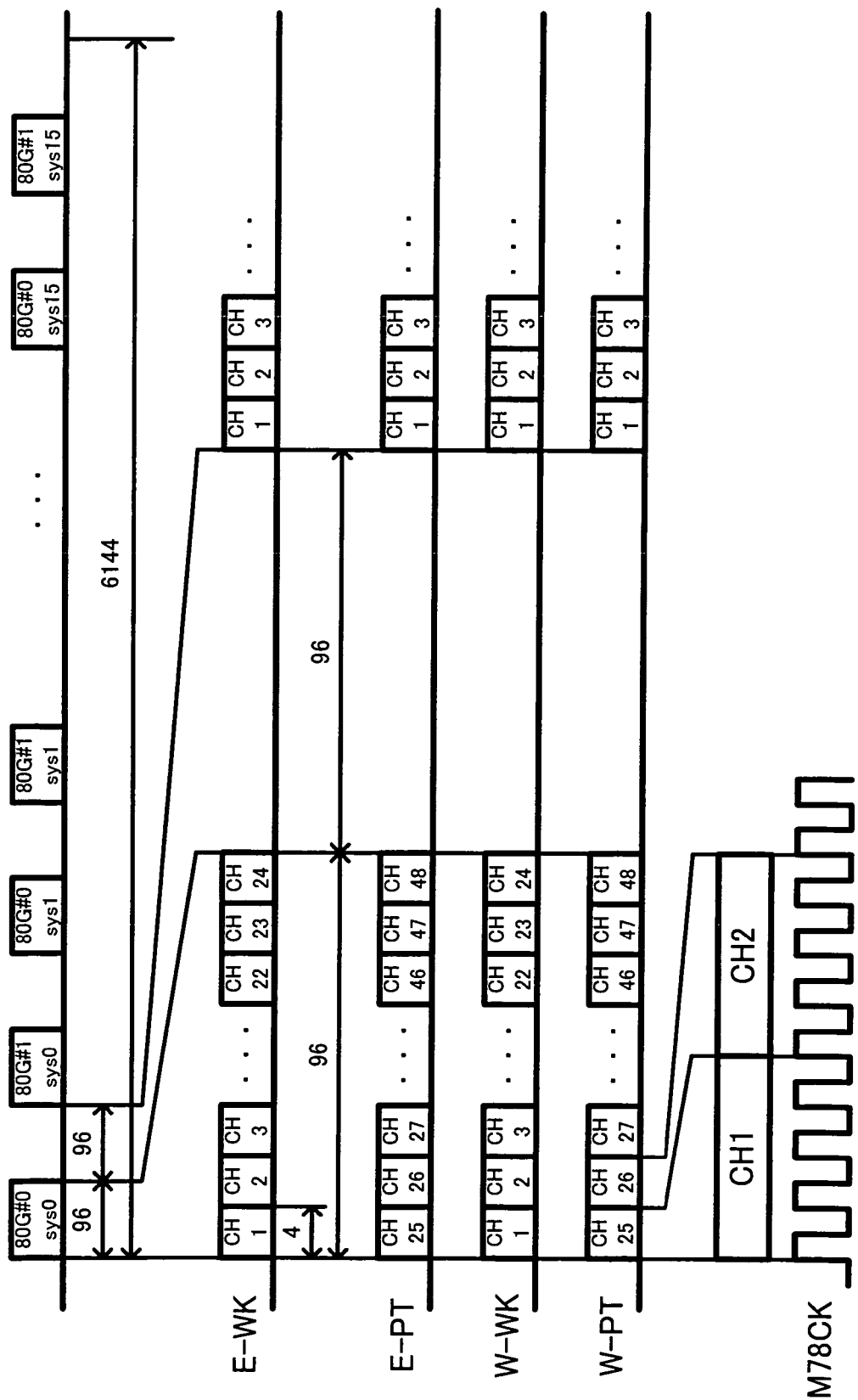
FIG. 5 is a diagram of a signal format showing a channel construction of the channel setting data and alarm data.

FIG. 5 shows a channel structure of channel setting data and alarm data that are generated by the unit control part 300 shown in FIG. 3, and that are notified to the channel setting data processing part 110. A processing clock in the unit is 77.76 MHz (this may also be described as 78M clock) that is equivalent to ½ of STS-3 (155.52 Mbps).

As shown in FIG. 5, signals occupy 96-bit 78M-clock area, using two lines of STS-48 as one processing unit. Specifically, regarding each of the two lines: a line in the signal direction in which a signal is inputted into the East side of a node device and is outputted from the West side thereof, i.e., an EW direction, and a line in its opposite side (the signal direction in which a signal is inputted into the West side and is outputted from the East side, i.e., a WE direction, a channel 1 (CH1) to a channel 24 (CH24) each serving as a work bandwidth (WK), and a channel 25 to a channel 48 (CH48) each serving as a protection bandwidth (PT), that is, 96 channels in total are used as one processing unit. This processing unit composed of 96 channels is taken as a system (SYS). The construction of signals will be described with reference to FIG. 7 to be illustrated later.

With respect to this processing unit, as an area for performing the interchange of channel setting data for each channel based on alarm data, there is provided a 96-bit 78M-clock area as large as the above-described "SYS" area, thereby allowing processing of a transmission capacity of 160 Gbps (two lines of STS-48 with transmission capacity of 5 Gbps are equivalent to 32 SYSs) in one frame (9720-bit 78M-clock area).

Figure 6:
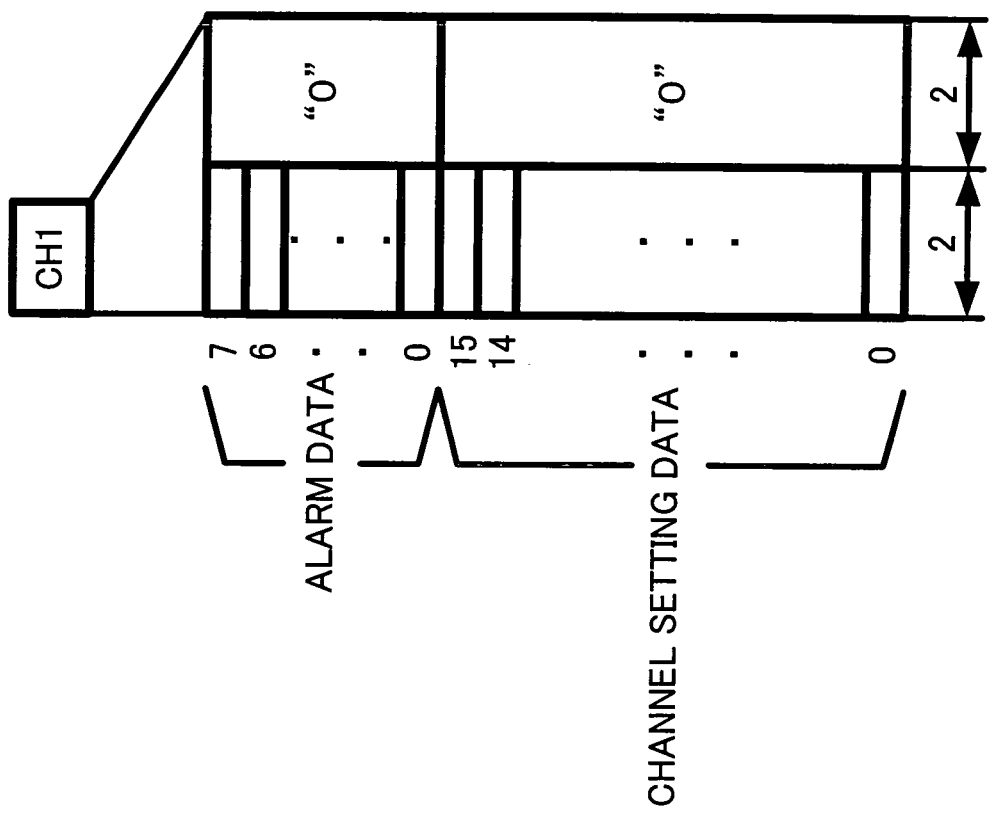
FIG. 6 is a diagram of a signal format showing an arrangement of the channel setting data and alarm data for each channel.

FIG. 6 shows arrangements of the channel setting data and alarm data for each channel, constituting the signal format in FIG. 5.

To each channel, 4 bits of 78M clocks are allocated, and 2 bits thereof are made a signal area. The channel setting data and the alarm data, respectively, are constituted of 16 parallel signals (0 to 15) and 8 parallel signals (0 to 7).

FIG. 7 shows a construction and signal contents of the channel setting data for each channel, shown in FIG. 6, that is, FIG. 7 illustrates channel setting destinations (interchange destinations) for each channel.

By 6 parallel signals (6 bits) from the 0th to the 5th, channel numbers (CH1 to CH48) with the STS-1 of a 50 Mbps capacity as a unit are distinguished, and by the 6th parallel signal (1 bit), Side numbers (Side 1 and Side 2) showing the two lines of STS-48 in the EW and WE directions are distinguished. By 4 parallel signals (4 bits) from the 7th to the 10th, system numbers (SYS#0 to SYS#15) with a 5 Gbps capacity (96 channel capacity) as 1 system are distinguished, and by the 11th parallel signal (1 bit), units (80G#0 and 80G#1) such that transmission capacity becomes 80 Gbps in 16 systems, are distinguished.

Thus, by the signals up to the 11th, channels constituting transmission capacity of 160 Gbps can be distinguished. Furthermore, in order to distinguish the transmission capacity of 160 Gbps, 3 parallel signals (3 bits) from the 12th to 14th are used.

Also, using the 15th signal (1 bit), it is set whether channel setting is executed.

Figure 8:
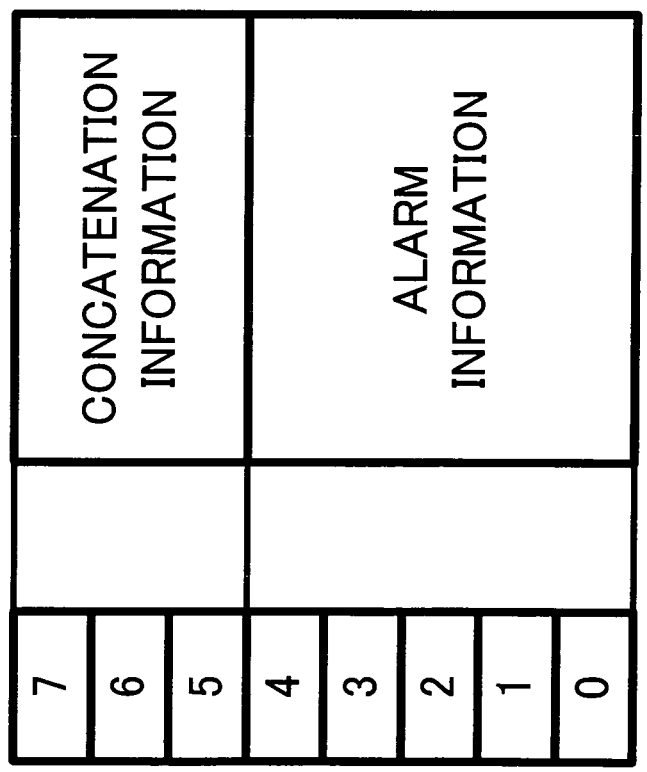
FIG. 8 is a diagram of a signal format showing a construction of the alarm data for each channel.

FIG. 8 shows a construction and signal contents of the alarm data for each channel, illustrated in FIG. 6.

By 5 parallel signals (5 bits) from the 0th to the 4th, an alarm state of each channel is set. By 3 parallel signals (3 bits) from the 5th to the 7th, a concatenation state of each channel is set.

Figure 9:
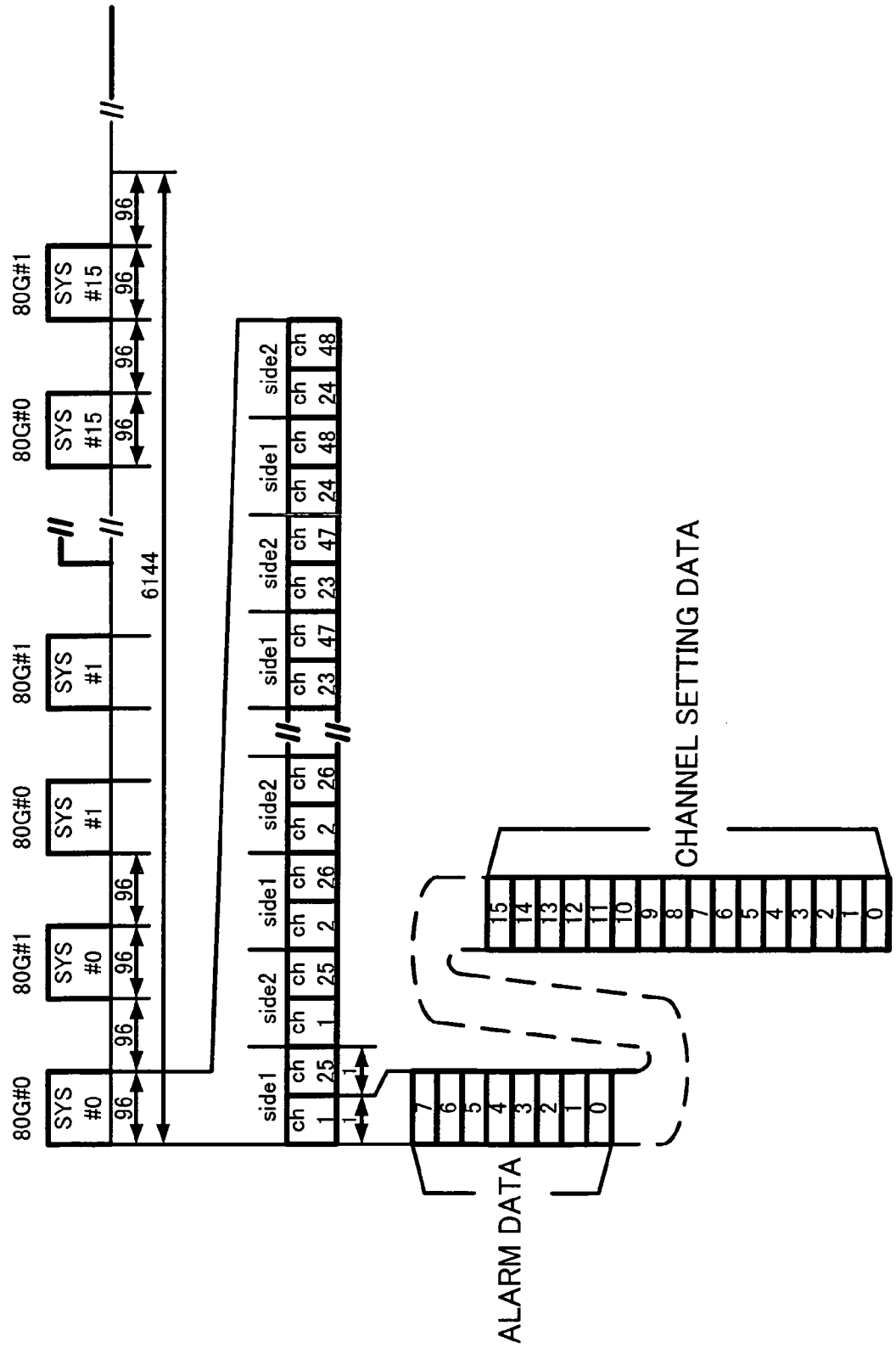
FIG. 9 is a diagram of a signal format used inside the channel setting data processing part.

FIG. 9 shows a format of signals used inside the channel setting data processing part in FIG. 4.

Figure 10:
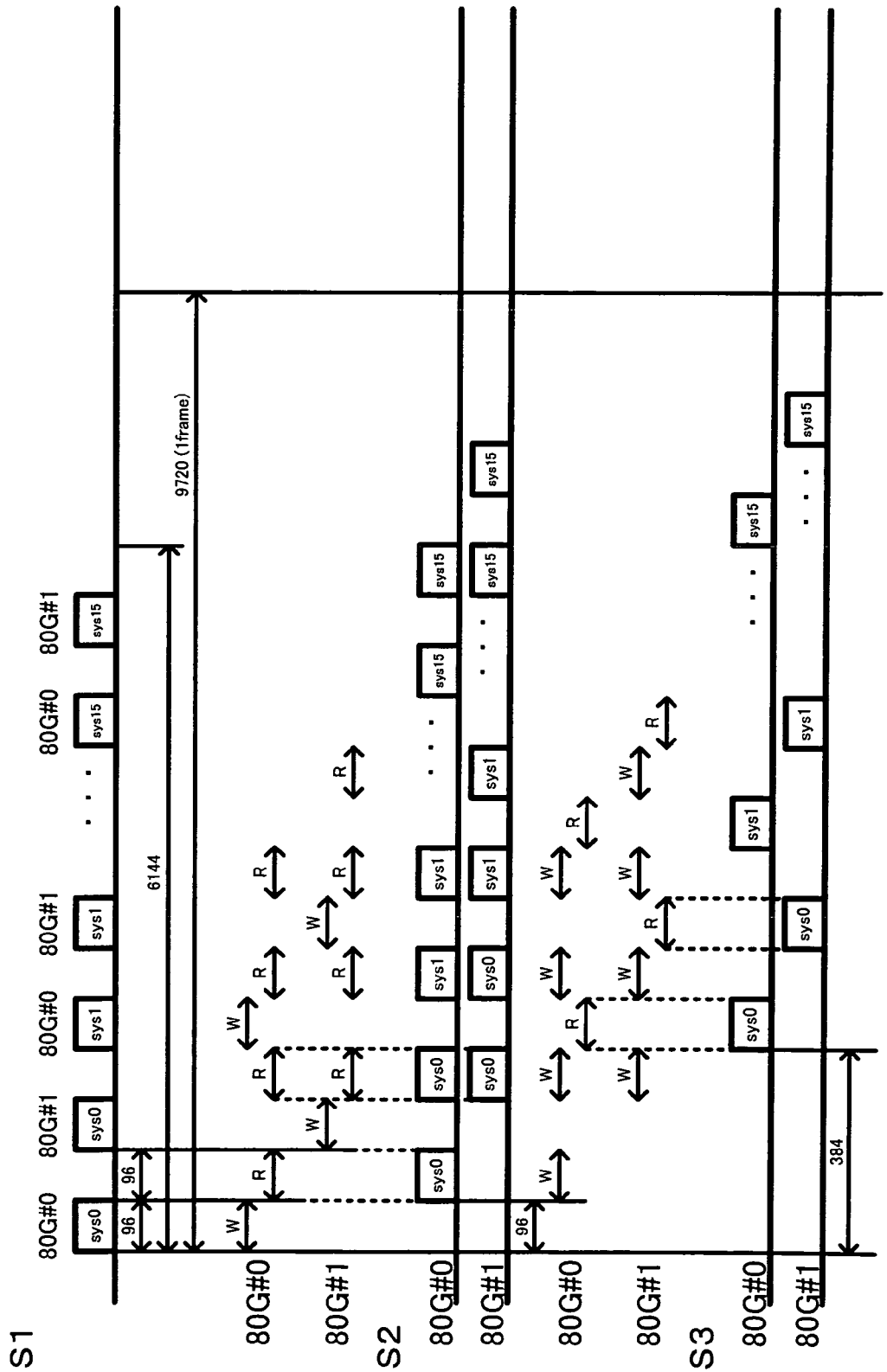
FIG. 10 is a diagram of timing of signals regarding a MEM part constituting the channel setting data processing part.
Figure 11:
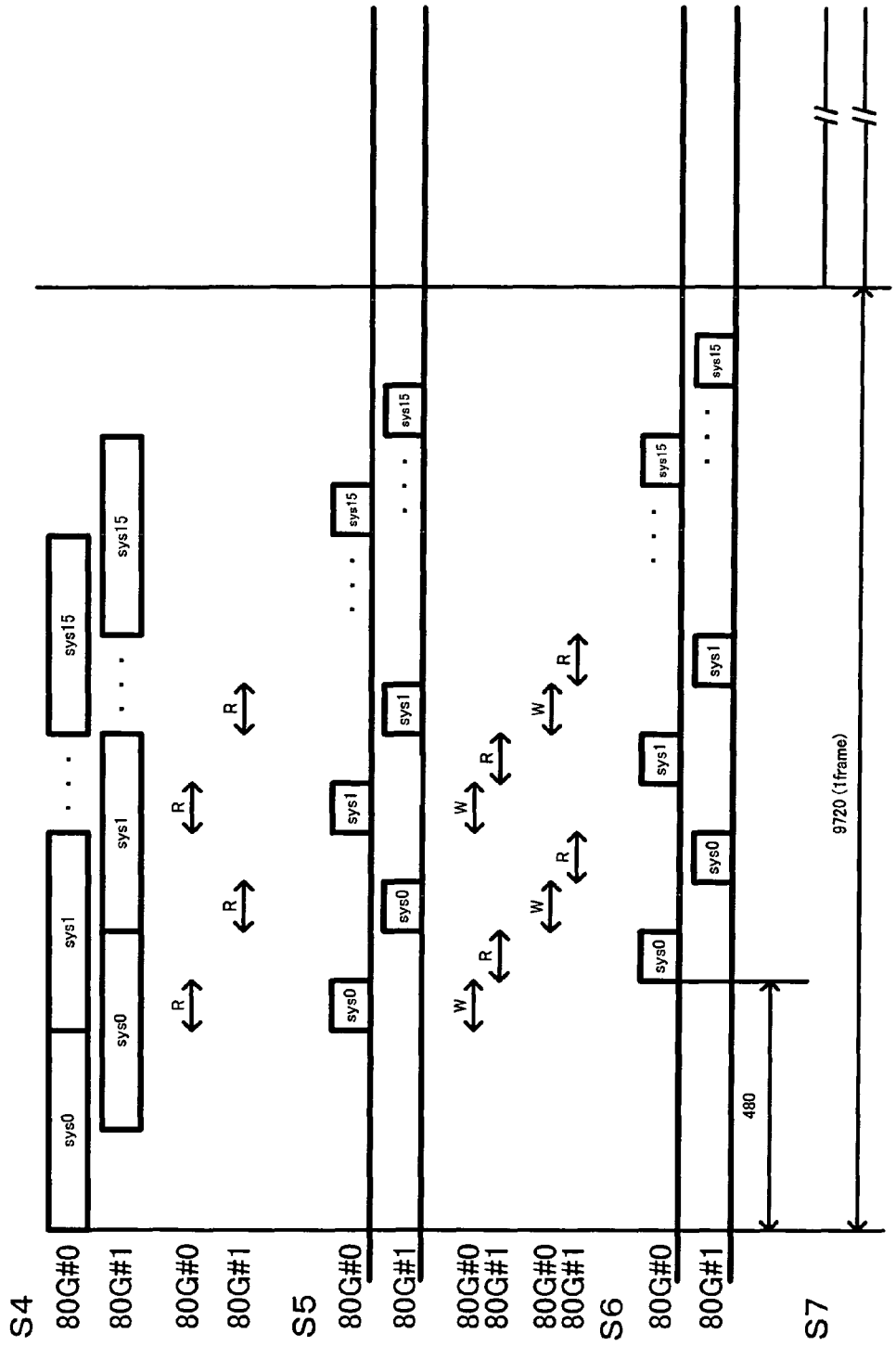
FIG. 11 is a diagram of timing of signals regarding a MEM part constituting the channel setting data processing part.

FIGS. 10 and 11 each show timing of signals regarding a MEM part constituting the channel setting data processing part in FIG. 4, and exhibit write timing and read timing with respect to a memory, respectively. System numbers are described as SYS0 to SYS15 (symbols # are omitted here).

FIGS. 12 to 15 each show a format of signals between functions constituting the channel setting data processing part in FIG. 4.

Figure 16:
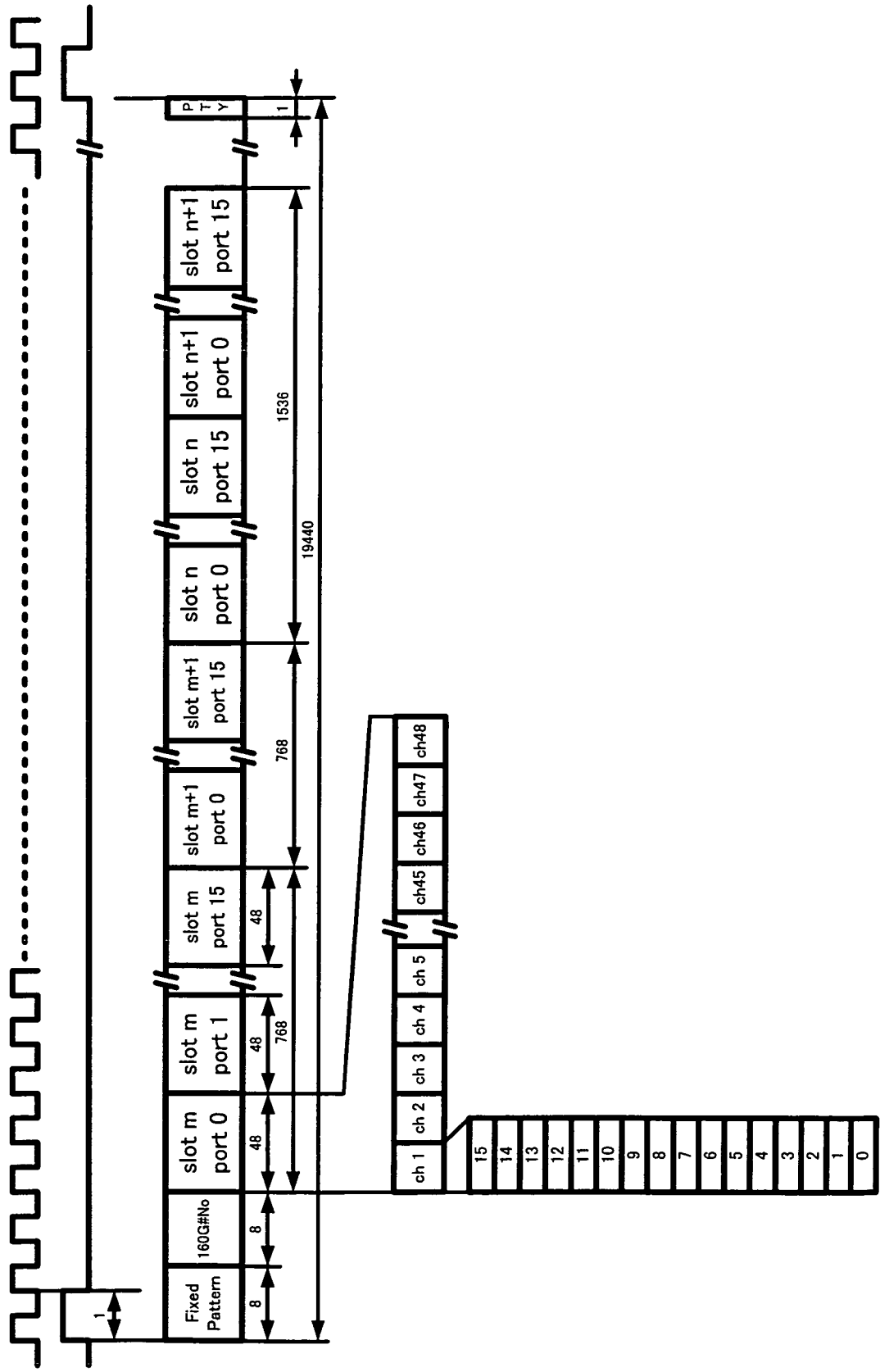
FIG. 16 is a diagram of a signal format of channel setting data of which the channel setting data processing part notifies an address control memory part.

FIG. 16 shows a format of channel setting data of which the channel setting data processing part 110 notifies the address control memory part 120.

In FIG. 4, a MEM part 1101 receives 24 parallel signals in the signal formats shown in FIGS. 5 to 8, and channel-adaptively stores channel setting data and alarm data, regarding 3072 channels (96 channels×16×2) corresponding to a transmission capacity of 160 Gbps. The MEM part 1101 reads out signals in the signal format shown in FIG. 9.

In FIG. 9, the processing unit of channel setting data is referred to as a SYS, which includes 96 channels corresponding two lines of the STS-48. A group from SYS#0 to SYS#15, with 80G#0 in one frame, and a group from SYS#0 to SYS#15, with 80G#1 in one frame, are alternately read out from the MEM part 1101. With respect to this processing unit, as an area for performing interchange processing of channel setting data based on alarm data for each channel, there is provided a 96-bit 78M-clock area as large as the above-described "SYS" area, thereby allowing processing of a transmission capacity of 160 Gbps (equivalent to 32 SYSs of two lines of STS-48 with transmission capacity of 5 Gbps) in one frame (9720-bit 78M-clock area). In each SYS, signals in SIDE1 and SIDE2 corresponding to two lines of the STS-48, and signals in the CH1 to CH24 (work bandwidths) and the CH25 to CH48 (protection bandwidths) in each of the SIDES are read out so as to be multiplexed. Here, signals for each CH are constituted of 24 parallel signals, that is, 16 parallel signals for channel setting data and 8 parallel signals for alarm data. The contents of these signals are the same as those shown in FIGS. 7 and 8.

In FIG. 4, a signal from the MEM part 1101 to a DTPSW part 1102; a signal from the DTPSW part 1102 to each of an XC part 1103 and a DCPThr part 1104; a signal from each of the XC part 1103 and the DCPThr part 1104 to an SS part 1105; and a signal from the SS part 1105 to a MEM part 1106 constitute the signal format shown in FIG. 9.

Figure 12:
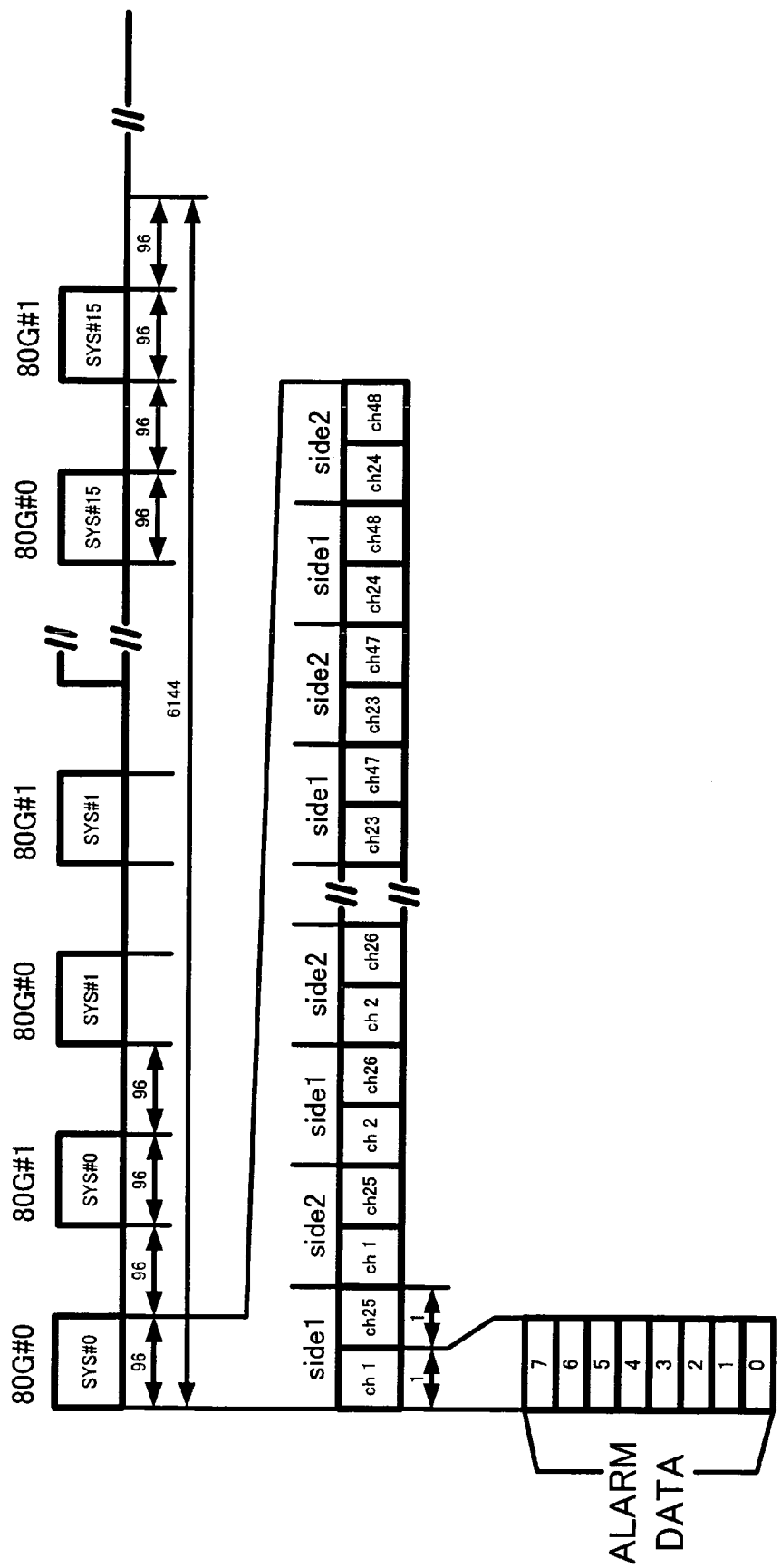
FIG. 12 is a diagram of a format of signals between functions constituting the channel setting data processing part.

In FIG. 4, the MEM part 1111 writes alarm data contained in the signals in FIG. 9, read out from the MEM part 1101, that is, the MEM part 1111 writes the signals shown in FIG. 12, into a two-side memory included in the MEM part 1111 for each of the groups of 80G#0 and 80G#1, as shown in S1 in FIG. 10. In the memory in which each of the groups of 80G#0 and 80G#1 is stored, the alarm data is written into a 96-bit area in SYS units in a time series manner, and read out in a 1.92-bit area, which is twice the 96-bit area. The read-out signals constitute timing as shown in S2 in FIG. 10, and are transmitted to a DTPSW control part 1112 shown in FIG. 4.

In FIG. 4, in the alarm data of channels constituting the DTP, the DTPSW control part 1112 sets control signals for switching transmission data from the work side to the protection side in case where a pertinent alarm is raised. That is, as in the case of signals shown in FIG. 13, control bits are provided for each channel, and when work bandwidths are selected, the logic level is set to "0", and when protection bandwidths are selected, the logic level is set to "1".

In FIG. 4, a MEM part 1113 writes signals (shown in FIG. 13) set by the DTPSW control part 1112, into a two-side memory included in the MEM part 1113. That is, the signals (shown in FIG. 13) transmitted from the DTPSW control part 1112 to the MEM part 1113 constitute timing of the signals shown by the S2 in FIG. 10. By this write timing (W) shown by the S2, the signals are written into the two-side memory included in the MEM part 1113.

Figure 13:
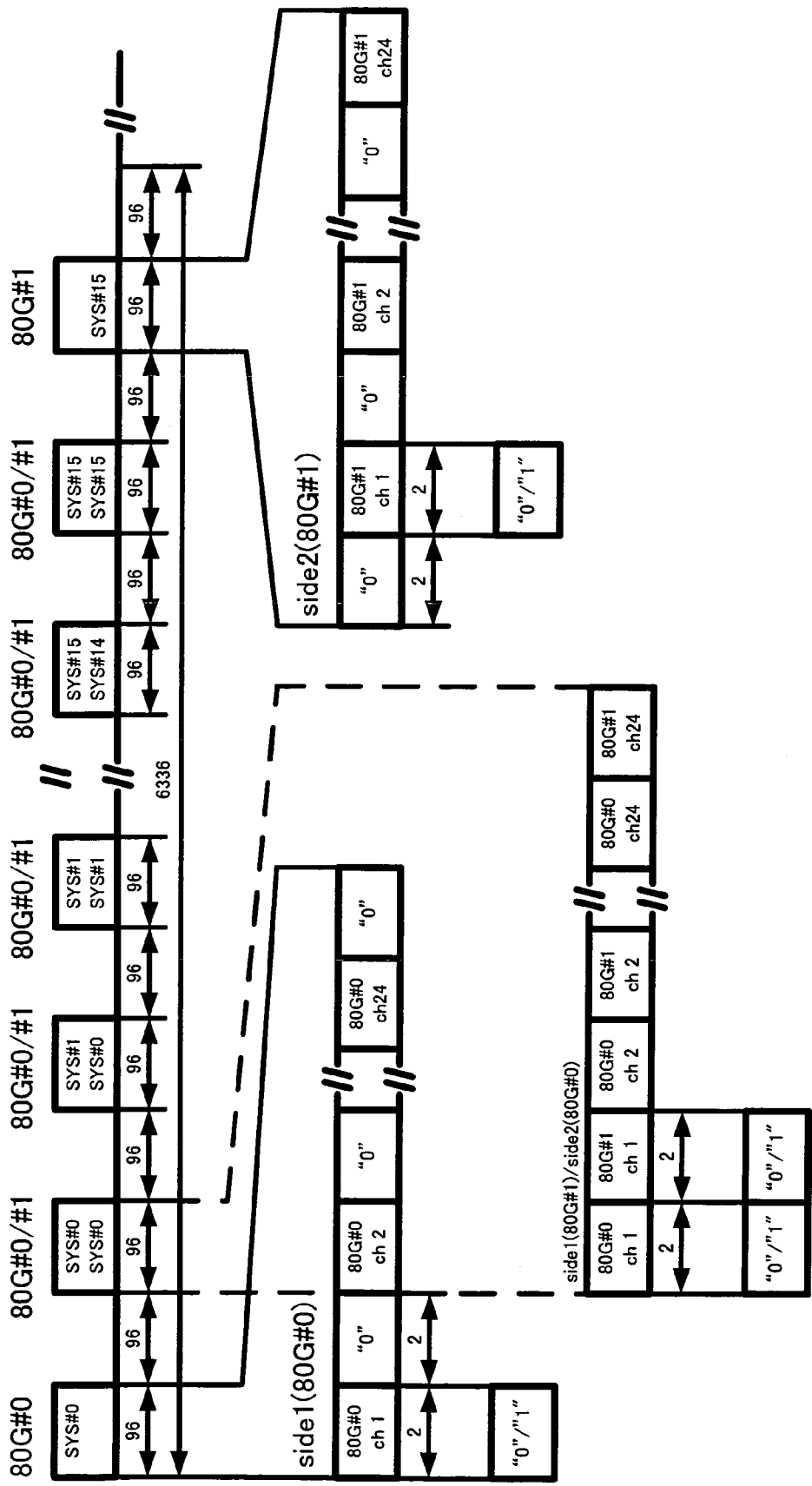
FIG. 13 is a diagram of a format of signals between functions constituting the channel setting data processing part.

In the S2 in FIG. 10, the MEM part 1113 reads out signals (control data) in FIG. 13, written in two 96-bit areas in SYS units, into one 96-bit area (as indicated by "R" in the S2 in FIG. 10). The read-out signals (control data) constitute timing shown in S3 in FIG. 10, and are transmitted to the DTPSW control part 1102 in FIG. 4.

In FIG. 4, with respect to the signals (in FIG. 9) read-out from the MEM part 1101, the DTPSW part 1102 makes a selection between the work bandwidth and the protection bandwidth for each channel in SYS units, based on the signals (control data) read-out by the above-described MEM part 1113.

The signals (signals in the format shown in FIG. 9) for which the selection between the work bandwidth and the protection bandwidth has been made in a channel unit by the DTPSW part 1102 are transmitted to the XC part 1103 and the DCPThr part 1104.

A MEM part 1114 writes alarm data (signals in the format shown in FIG. 12) contained in the signals for which the selection between the work bandwidth and the protection bandwidth has been made in a channel unit by the DTPSW part 1102, into two-side memory included in the MEM part 1114.

Based on the alarm data written in the MEM part 1114, an XC control part 1115 generates, in channel units, signals (channel setting data with contents shown in FIG. 7) for controlling, in SYS units, the switching (channel setting) between work bandwidth channel signals in the CH1 to CH24 and protection bandwidth channel signals of the CH25 to CH48.

Figure 14:
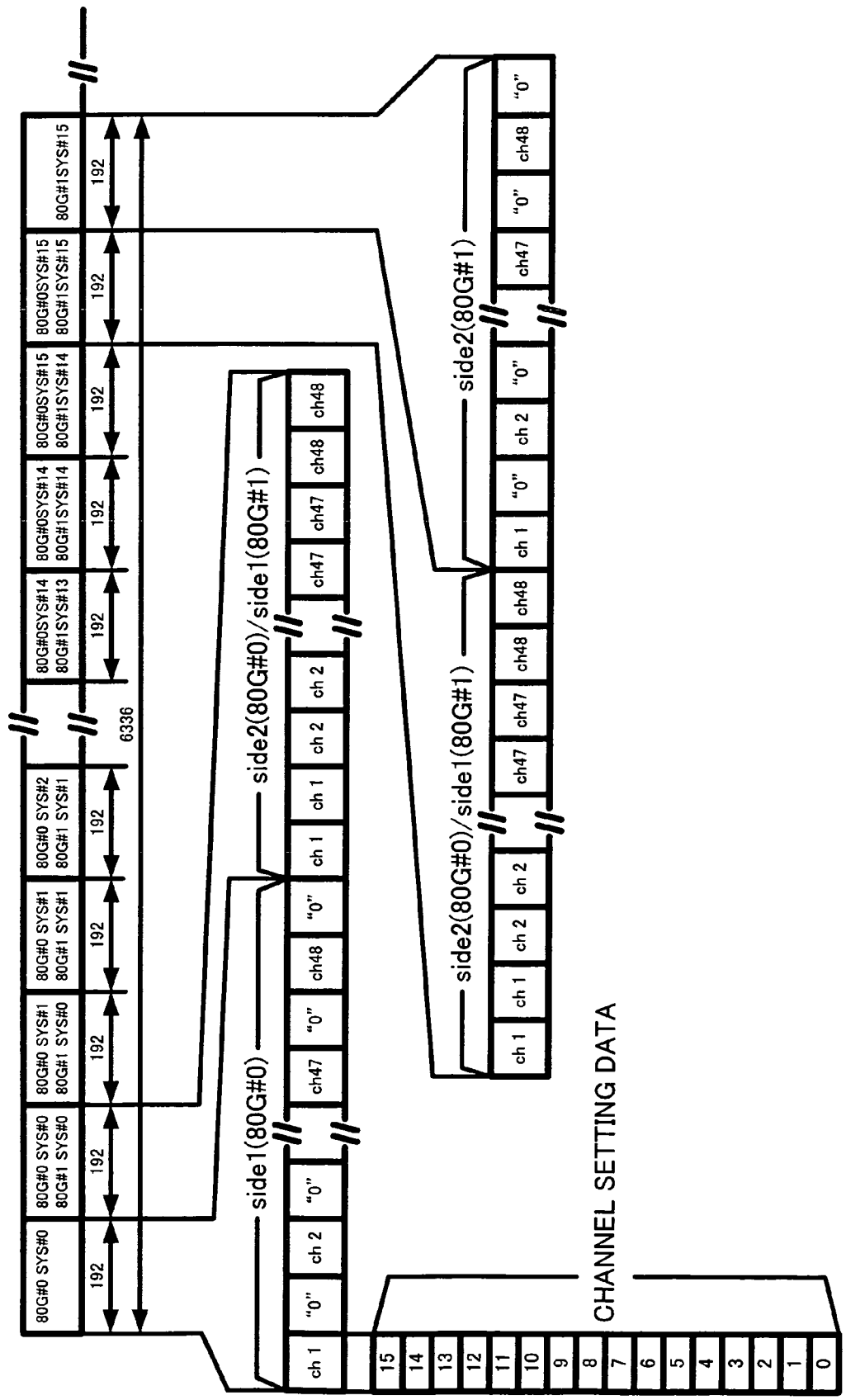
FIG. 14 is a diagram of a format of signals between functions constituting the channel setting data processing part.

A MEM part 1116 writes the channel setting data generated by the XC control part 1115 shown in FIG. 14, into a two-side memory included in the MEM part 1116.

In S4 in FIG. 11, the MEM part 1106 reads out the channel setting data written in SYS units, into a 96-bit area for each SYS.

In FIG. 4, the XC part 1103 performs channel setting with respect to the signal (in FIG. 9) transmitted from DTPSW part 1102, based on the signal (channel setting data) written in the MEM part 1116.

The DCPThr part 1104 outputs the signals (in FIG. 9) transmitted from the DTPSW part 1102 in conformance with the timing of signals outputted by the XC part 1103.

Signals outputted by the XC part 1103 (described as Add side signals) and signals outputted by the DCPThr part 1104 (described as Thr side signals) are transmitted to the SS part 1105, wherein both of these two kinds of signals are ones in the format shown in FIG. 9.

A MEM part 1117 write alarm data contained in the Add side signals and alarm data contained in the Thr side signals (each of these data is constituted of signals with format shown in FIG. 12) into a two-side memory included the MEM part 1117, as shown in S5 in FIG. 11.

As shown in S6 FIG. 11, based on the alarm data of channels constituting the DCP, read-out from the MEM part 1117 in SYS units, an SS control part 1118 generates control signals for selecting the Thr side signals in case where a pertinent alarm is raised. That is, as in the case of signals shown in FIG. 15, there are provided control bits for channel units, and when Add side signals are selected, the logic level is set to "0", and when Thr side signals are selected, the logic level is set to "1".

Figure 15:
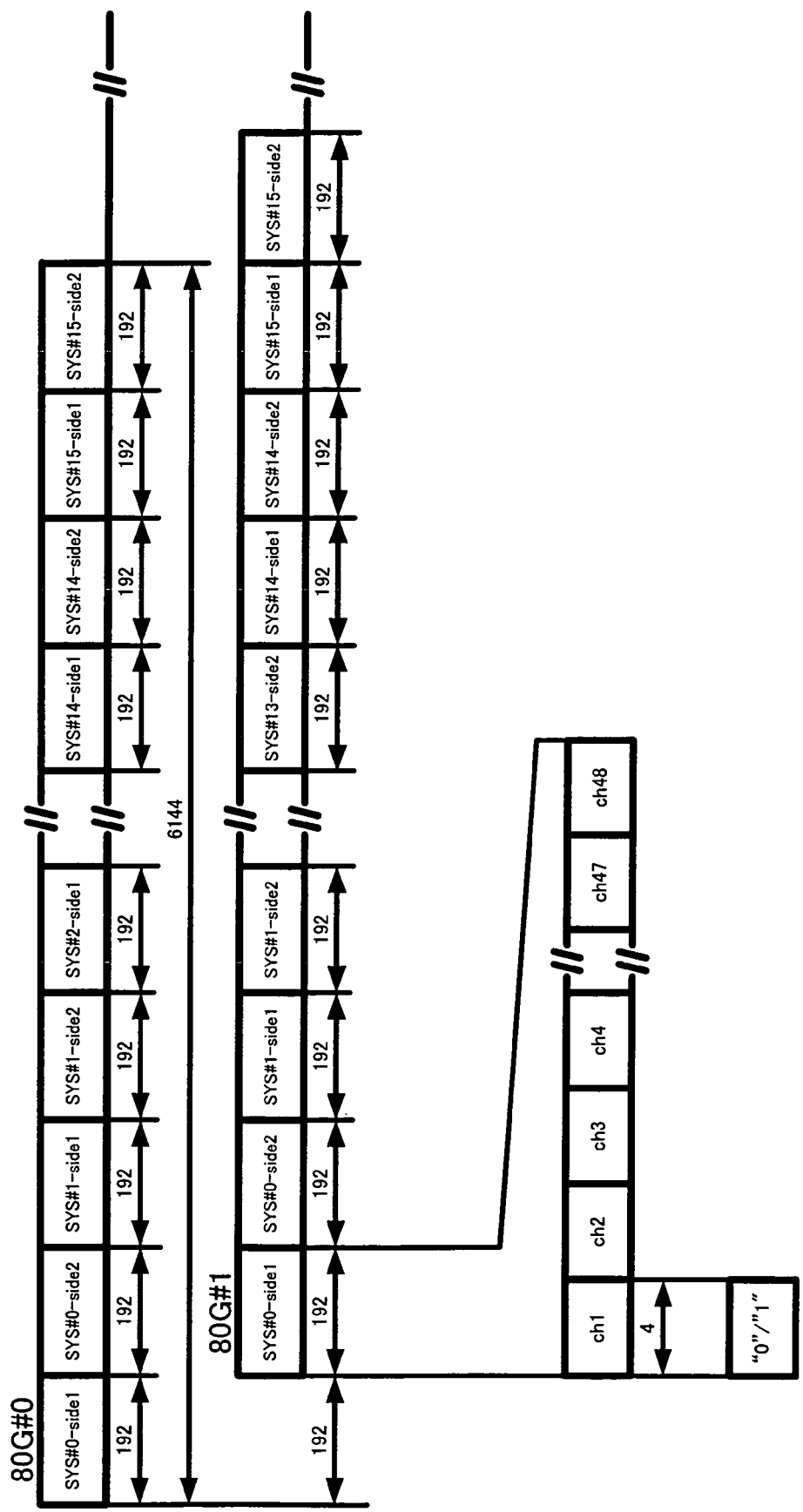
FIG. 15 is a diagram of a format of signals between functions constituting the channel setting data processing part.

A MEM part 1119 writes signals (shown in FIG. 15) generated by the SS control part 1118, into a two-side memory included in the MEM part 1119. That is, the signals (in FIG. 15) transmitted from the SS control part 1118 to the MEM part 1119 constitutes timing shown by the S5 in FIG. 11. By this timing (W) shown by the S5, the signals in FIG. 15 are written into the two-side memory included in the MEM part 1119.

In FIG. 4, with respect to the Add side signals and the Thr side signals, the SS part 1105 selects either Add side signals or Thr side signals for each channel in SYS units, based on signals (control data) read-out from the above-described MEM part 1119.

The MEM part 1106 sequentially writes signals (signals in the format shown in FIG. 9) as which either Add side signals or Thr side signals have been selected for each channel in SYS units, and after having collectively read out 3072 channels of channel setting data with a transmission capacity of 160 Gbps, the MEM part 1106 transmits them to the address control memory part 120 shown in FIG. 3 by the signal format shown in FIG. 16.

As can be seen from the signal formats shown in FIG. 16, in order to transmit the above-described signals to the address control memory part 120 that is different in function block from the channel setting data processing part 110 shown in FIG. 3, a 1-bit 78M-clock signal indicating the leading-edge of signals is concurrently transmitted, and a fixed pattern indicating the top of signals is provided at the leading-edge part of the signals.

A timing generation part 1107 generates clock signals, timing signals and the like necessary for the writing-in and reading-out of the MEM parts described above.

By this embodiment, in the time slot interchanger that uses the DTP formation and the DCP formation for implementing redundant constructions and interconnections between ring networks, the interchange processing of channel setting data based on the alarm data can be realized with a transmission capacity for two of ring network lines as a processing unit. Therefore, the processing of channel setting data necessary for the time slot interchange wherein the ring line capacity is 64 lines of STS-48 (160 Gbps capacity), the channel setting unit is STS-1 (50 Mbps capacity), and the channel setting number is 3072 channels (96 ch×32=3072 ch), can be realized by performing the processing in a SYS unit of 96 channels (5 Gbps capacity), and sequentially repeating this processing in SYS unit 32 times. Specifically, the MEM parts 1101 and 1106 in FIG. 4 each need a memory capacity corresponding to transmission capacity 160 Gbps, but the MEM parts 1111, 113, 1114, 1116, 1117, and 1119 are each capable of addressing the above-described processing by a memory capacity corresponding to transmission capacity 5 Gbps. This allows a reduction in the scale of circuitry necessary for processing channel setting data, particularly memory scale.

When the channel setting processing capacity increases, this increase in the channel setting processing capacity can be accommodated by increasing the number of repetitions of processing in the basic circuitry, without increasing the number of circuits such as memories.

Second Embodiment

In the first embodiment, the case has been supposed in which the maximum value of transmission capacity processed by a single time slot interchanger is 160 Gbps, that is, STS-48 with a line speed of 2.4 Gbps are accommodated up to 64 lines.

In a second embodiment, a case is supposed in which a maximum value of transmission capacity processed by a single time slot interchanger is 480 Gbps for example.

Figure 17:
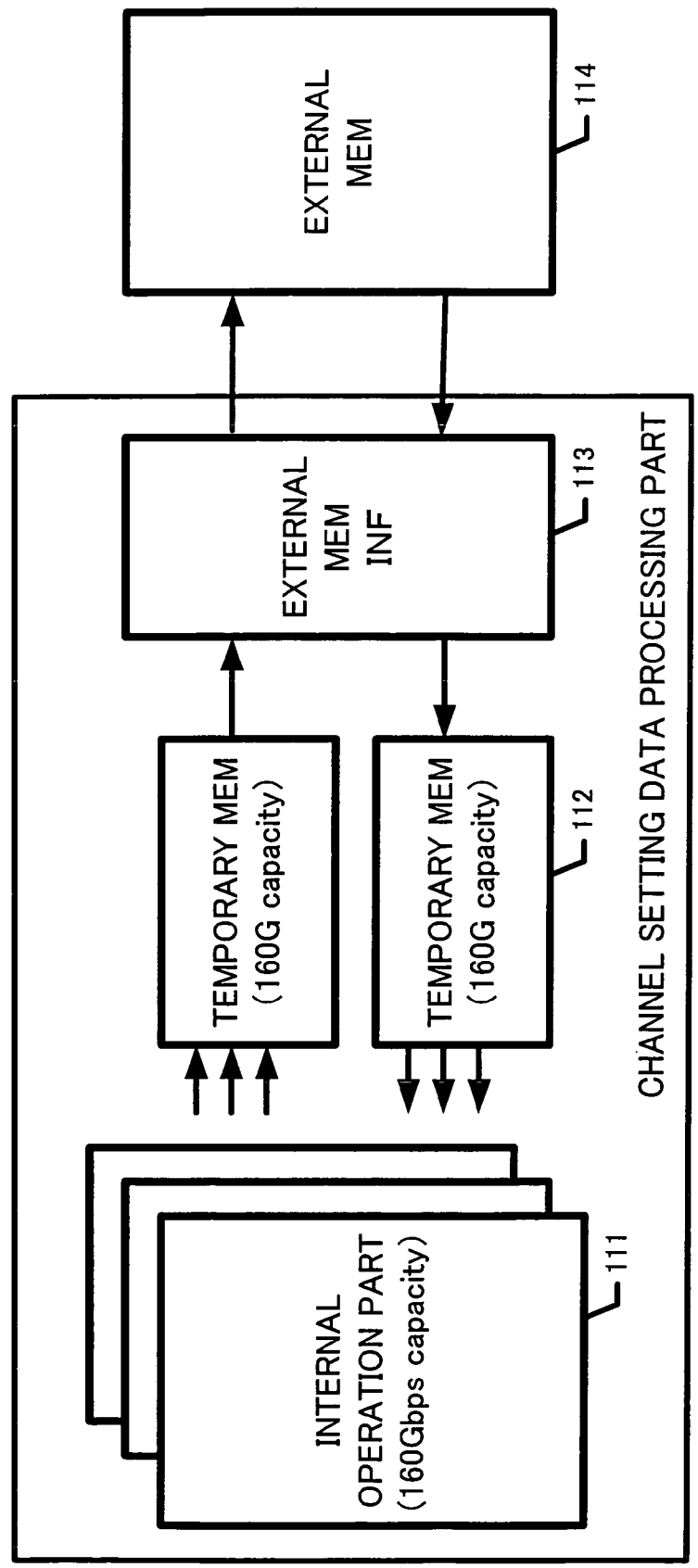
FIG. 17 is a diagram showing a 480 Gbps capacity processing function.

FIG. 17 shows a 480 Gbps capacity processing function. Here, reference numeral 111 denotes an internal processing part, 112 denotes a temporary memory part, 113 denotes an external memory INF part, and 114 denotes an external memory.

The internal processing part 111 has the function of the channel setting data processing part 110 described in the first embodiment, and performs processing of channel setting data with a capacity of 160 Gbps.

The external memory INF part 112 is a memory for temporarily storing channel setting data with capacity of 160 Gbps, described in the first embodiment, and constitutes a memory in a two-side configuration.

The external memory INF part 113 functions as an interface for exchanging data between the external memory 114 and the temporary memory part 112 in a two-side configuration, when processing of channel setting data with capacity of 160 Gbps is performed.

The external memory 114 stores channel setting data with capacity of 480 Gbps. The external memory 114 is a memory corresponding to the MEM parts 1101 and 1106 in the first embodiment.

FIG. 18 shows 480 Gbps capacity timing.

As described in the first embodiment, since the processing of channel setting data with a capacity of 160 Gbps can be performed by 1 frame, data necessary for a capacity unit of 160 Gbps from the external memory 114 is written into the two-side temporary memory part 112 in an alternate manner, via the external memory INF part 113.

The internal processing part 111 reads out channel setting data from one side of the temporary memory part 112, and after having performed processing necessary for the channel setting (processing contents having been described in the first embodiment), the internal processing part 111 writes the processing results into one side of the temporary memory part 112. Then, the internal processing part 111 sequentially performs processing for each 160 Gbps capacity, and sequentially writes the results into the two-side temporary memory part 112 in an alternate manner.

The external memory INF part 113 sequentially writes the above-described channel setting data stored in the temporary memory part 112 into the external memory.

By this embodiment, the interchange processing of channel setting data necessary for the time slot interchange wherein the ring line capacity is 192 lines of STS-48 (480 Gbps capacity), the channel setting unit is STS-1 (50 Mbps capacity), and the channel setting number is 9216 channels (3072 ch×3=9216 ch), can be realized by performing the processing in 160 Gbps capacity units, and sequentially repeating this processing in 160 Gbps capacity units. Therefore, by constituting the internal processing part, the temporary memories, the external memory INF part by ASICs, and by setting the external memories in response to the magnitude of processing capacity, the scale of processing circuits for channel setting data, constituted of ASICs, particularly that memory scale can be reduced.

When the channel setting processing capacity increases, this increase in the channel setting processing capacity can be accommodated by adjusting the capacity of the external memory, and increasing the number of repetitions of processing in the basic ASIC circuitry, without changing ASIC circuits.

What is claimed is:

1. A time slot interchanger comprising:
   a time slot interchange circuit coupled with channels and configured to interchange time slots of channel signals included in a multiplexed transmission signal;
   an address control memory circuit to generate write addresses and read addresses for interchanging the time slots, the write addresses and the read addresses being notified to the time slot interchange circuit; and
   a channel-setting data processing circuit to receive alarm data and channel-setting data indicating the time slots to which the channel signals constituting the multiplexed transmission signal are allocated, and process the channel-setting data in accordance with the alarm data, and
   wherein the channel-setting data processing circuit includes:
      a first memory circuit to repeatedly store the alarm data for processing the channel-setting data, the processing generating control data usable to interchange the time slots in accordance with a preset second transmission capacity using a preset first transmission capacity of the first memory circuit, the first memory circuit having a memory capacity corresponding to the first transmission capacity; and
      a second memory circuit to store processed control data corresponding time slots of the channel-setting data with the alarm data in accordance with the second transmission capacity, the second memory circuit having a memory capacity corresponding to the second transmission capacity,
   wherein the write address and read address are generated based on the channel-setting data stored in the second memory circuit, and the first transmission capacity is 1/n of the second transmission capacity, wherein n is an integer and the alarm data for processing the channel-setting data of said all channels is processed by implementing processing repeated n times, and
   wherein the alarm data includes control bits usable to switch transmission data from a work bandwidth to a protection bandwidth in response to an alarm, the control bits for each channel settable to a logic value of "0" when work bandwidths are selected and a logic value of "1" when protection bandwidths are selected.

2. The time slot interchanger according to claim 1, wherein the first memory circuit is configured to store n times data for processing the channel-setting data in accordance with the preset first transmission capacity so as to process the channel setting data in accordance with the preset second transmission capacity.

3. The time slot interchanger according to claim 1, wherein the time slot interchanger is a SONET-adaptive apparatus or a SDH-adaptive apparatus, wherein the first transmission capacity has a transmission capacity corresponding to two of transmission lines of OC-48 in the SONET, or STM-16 in the SDH, and the second transmission capacity is 32 times as large as the first transmission capacity, wherein n is 32.

4. The time slot interchanger according to claim 1, wherein the time slot interchanger is a SONET-adaptive apparatus or a SDH-adaptive apparatus, wherein the channel-setting data is processed with a STS-1 in the SONET or a STM-0 in the SDH as a unit.

5. The time slot interchanger according to claim 1, wherein the time slot interchanger is the apparatus having 2F-BLSR system.

6. The time slot interchanger according to claim 1, comprising:
switching transmission of the alarm data stored in the first memory circuit sequentially to the second memory circuit, using the write addresses and read addresses generated based on the channel-setting data stored in the second memory circuit, and
where the write addresses and the read addresses are generated in accordance with the first transmission capacity.

* * * * *